(12) United States Patent
Moore et al.

(10) Patent No.: US 6,724,872 B1
(45) Date of Patent: Apr. 20, 2004

(54) PERSONALIZED MESSAGES OVER INTERNET CALL WAITING

(75) Inventors: Darryl Cynthia Moore, Conyers, GA (US); Linda A. Roberts, Decatur, GA (US); Anita Hogans Simpson, Decatur, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 156 days.

(21) Appl. No.: 10/022,940

(22) Filed: Dec. 17, 2001

(51) Int. Cl.[7] ............................................. H04M 11/00
(52) U.S. Cl. .............................. 379/93.35; 379/93.23; 379/88.13; 379/142.15; 379/215.01
(58) Field of Search ......................... 379/93.35, 93.23, 379/88.13, 88.17, 88.19, 88.2, 88.21, 142.01, 142.15, 215.01

(56) References Cited

U.S. PATENT DOCUMENTS

| | | | | |
|---|---|---|---|---|
| 5,327,486 A | * | 7/1994 | Wolff et al. | 379/93.23 |
| 6,219,413 B1 | * | 4/2001 | Burg | 379/215.01 |
| 6,404,860 B1 | * | 6/2002 | Casellini | 379/88.17 |

* cited by examiner

*Primary Examiner*—Chan Wing
(74) *Attorney, Agent, or Firm*—Merchant & Gould (57) ABSTRACT

A method and system are provided for delivering personalized messages to a calling party who calls a called party who is engaged in an Internet session over a telephone line not capable of receiving telephone calls without interrupting the Internet connection. The called party receives a notification on her computer screen of an incoming telephone call from a calling party. A drop box on the called party's computer temporarily interrupts the called party and identifies the calling party. The called party may answer the call, forward the call to a separate telephone number, place the call on hold, send the call to voice mail, or type, select or record a personalized message that is delivered to the calling party without interrupting the Internet session. The personalized message may be a text message or a voice message. Text messages are converted from text to speech before delivery to the calling party. If the calling party'terminates the call attempt prior to hearing the message, the calling party is contacted for delivery of the message. If the calling party is not reached after a number of attempts, the called party is notified on her computer screen, without interrupting her Internet session, that the message to the calling party was not delivered. The called party may request the calling party be placed on hold after hearing the personalized message. At the expiration of the hold time, the called party may terminate the Internet session and automatically connect to the calling party.

47 Claims, 8 Drawing Sheets

PERSONALIZED MESSAGES OVER INTERNET CALL WAITING

FIELD OF THE INVENTION

This invention relates to a method and system for providing personalized messages over an Internet call waiting system.

BACKGROUND OF THE INVENTION

A growing number of businesses, homes, and schools make use of the Internet through a variety of personal and business computing systems. In a typical home setting, an Internet user goes on-line via her home computer over a telephone line connected to her home. If the user has a standard analog telephone line, for example, non-digital subscriber line, non-T1, etc., that is used for both voice telephone calls and Internet service, the user ties up the telephone line anytime the user is connected to the Internet. Likewise, if the user is using the telephone line for voice telephone calls, the user may not use the same line to connect to the Internet. If the user is on the Internet via the telephone line, and the user receives a voice telephone call, the calling party either receives a busy signal or is forwarded to another telephone number, such as the called party's voice mail service, through a call forwarding service. In order to avoid this problem, the user may subscribe to a separate phone line for use exclusively for Internet connection. Likewise, the user may subscribe to a digital subscriber line or T1 line over which the user may send and receive both Internet connectivity and voice telephone connectivity simultaneously. However, such solutions are expensive, and often, digital subscriber lines and T1 lines are not available at the user's home.

Internet call waiting systems have been used that notify a called party of an incoming voice telephone call when the called party is engaged in an Internet session. Such systems allow the called party to answer the telephone call and thereby disconnect the Internet session or forward the calling party to a different telephone number. However, such systems fail to allow the called party to interact with the calling party while maintaining the Internet connection.

Still other systems have been used for allowing a text-to-speech message to be sent to a calling party after a calling party is directed to the called party's voice mail system. Unfortunately, such systems do not allow real-time interaction between the called party and the calling party while the call is in progress so that called party may be connected to the calling party at the conclusion of the called party's Internet session.

It is with respect to these and other considerations that the present invention has been made.

SUMMARY OF THE INVENTION

In accordance with the present invention, the above and other problems are solved by a method and system for delivering personalized messages to a calling party who calls a called party who is engaged in an Internet session over a telephone line not capable of receiving telephone calls without interrupting the Internet connection. The called party receives a notification on her computer screen of an incoming telephone call from a calling party. A drop box on the called party's computer temporarily interrupts the called party and identifies the calling party. The called party may answer the call, forward the call to a separate telephone number, place the call on hold, send the call to voice mail, or type, select or record a personalized message that is delivered to the calling party without interrupting the Internet session. The personalized message may be a text message or a voice message.

Text messages are converted from text to speech before delivery to the calling party. If the calling party terminates the call attempt prior to hearing the message, the calling party is contacted for delivery of the message. If the calling party is not reached after a number of attempts, the called party is notified on her computer screen, without interrupting her Internet session, that the message to the calling party was not delivered.

According to another aspect, the called party may request the calling party to be placed on hold after hearing the personalized message. At the expiration of the hold time, the called party may terminate the Internet session and automatically connect to the calling party.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE PREFERRED EMBODIMENT

The following description of an exemplary embodiment of the present invention is made with reference to the above-described drawings wherein like numerals refer to like parts or components throughout several figures. The present invention is directed to a method and system for delivering personalized messages to a calling party who calls a called party who is engaged in an Internet session over a telephone line not capable of receiving telephone calls without interrupting the Internet connection.

While working on-line, the called party receives a notification on her computer screen of an incoming telephone call from a calling party. A drop box on the called party's computer temporarily interrupts the called party and identifies the calling party. The called party is given the options of answering the call and thereby terminating the Internet session, forwarding the call to a separate telephone number, placing the call on hold, or sending the call to voice mail. According to one embodiment of the present invention, the called party is given the option of typing or selecting a previously stored personal text message that is delivered to the calling party without interrupting the Internet session. Alternatively, the called party may record and deliver to the calling party a personalized voice message without interrupting the Internet session.

The text message typed or selected by the called party is converted from text-to-speech and is played to the calling party before the calling party terminates her call attempt. During the text-to-speech conversion process, the calling party may be provided a recorded message such as "Please wait, the called party has a personal message for you." Alternatively, a personalized voice message selected by the called party may be sent to the calling party immediately.

If the calling party terminates the call attempt prior to hearing the message, the calling party's phone is called and the text-to-speech message is delivered if the calling party answers. If the calling party's voice mail system answers, the message is left in the voice mail system. If the calling party's line is busy, the delivery of the message is attempted to the calling party for a set number of times. If the calling party is not reached, the called party is notified on her computer screen, without interrupting her Internet session, that the message to the calling party was not delivered.

In either case of a personalized text message or personalized voice message, the called party may request the calling party to be placed on hold for a number of minutes. At the expiration of the hold time, the called party may terminate her Internet session and be connected to the calling party. For example, the called party may type a personalized message such as "Hi Joe, I'm in the middle of placing an order over the Internet. Hold on for five minutes. I'll be right with you." According to the present invention, the announcement is played to the calling party, and if the calling party accepts being placed on hold, the calling party is placed on hold until the called party terminates her Internet session. When the called party terminates her Internet session, she is then connected with the calling party. Accordingly, the called party may send a personalized text or voice message to a calling party followed by connection to the calling party at a later time.

Exemplary Operating Environment

Figure 1:
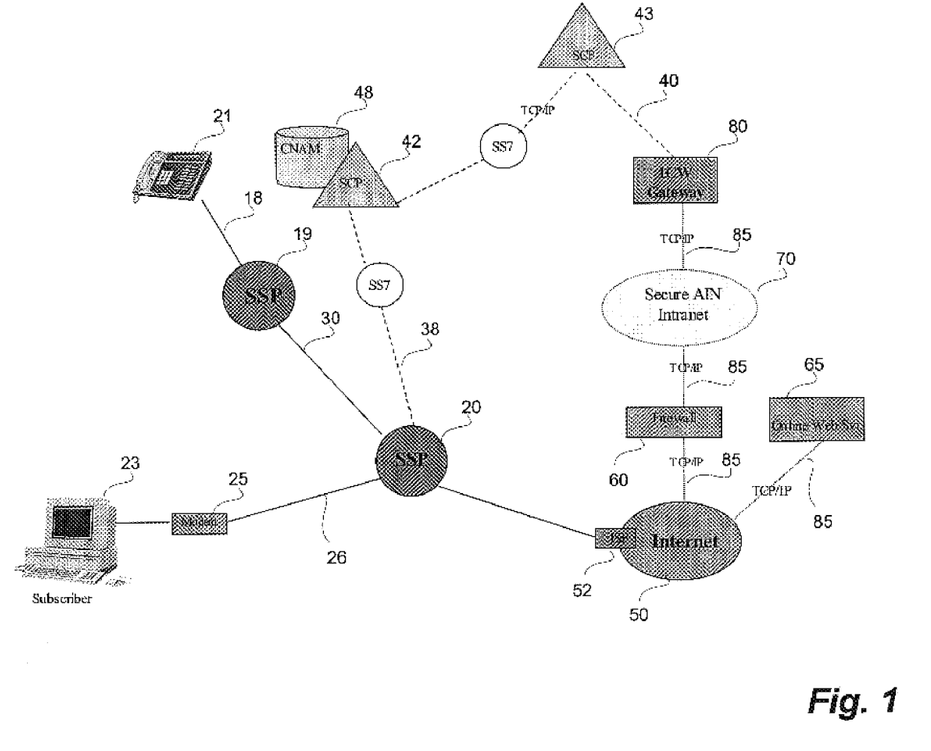
FIG. 1 is a block diagram illustrating components of a telephone network that provides an exemplary operating environment for the present invention.

It is advantageous to describe an exemplary operating environment in which the current invention may reside. FIG. 1 is a block diagram illustrating components of a telephone network that provides an exemplary operating environment for the present invention. The public switched telephone network that evolved in the 1980s incorporated the advanced intelligent network (AIN). Some of the components of the advanced intelligent network are illustrated in FIG. 1. The advanced intelligent network (AIN) uses the signaling system 7 (SS7) network for signal or system control message transport. The components thereof are well-known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 19 and 20. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, central offices switches (SSP) 19 and 20 have a plurality of subscriber lines 18 and 26 connected thereto. Each of the subscriber lines 18 and 26 is connected to a terminating piece or pieces of customer premises equipment that are represented by telephone 21 and computer 23. SSP switches 19 and 20 are connected by a trunk circuit 30. These are the voice path trunks that interconnect the central offices 19 and 20 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number.

Much of the intelligence, and the basis for many of the enhanced features of the network, resides in local AIN service control points (SCP) 42, 43. As is known to those skilled in the art, AIN service control points, such as SCP 43, are physically implemented by relatively powerful fault tolerant computers. Among the functions performed by the service control points is maintenance of network databases used in providing enhanced services.

The SCP 42 is also connected to a caller name (CNAM) database 48. The CNAM database comprises a plurality of directory numbers along with associated names for the directory numbers. The CNAM database may be used to provide a look-up database to provide caller identification (ID) service. The CNAM database may be comprised of directory numbers from wireline customers as well as wireless customers of a wireless network.

Figure 6:
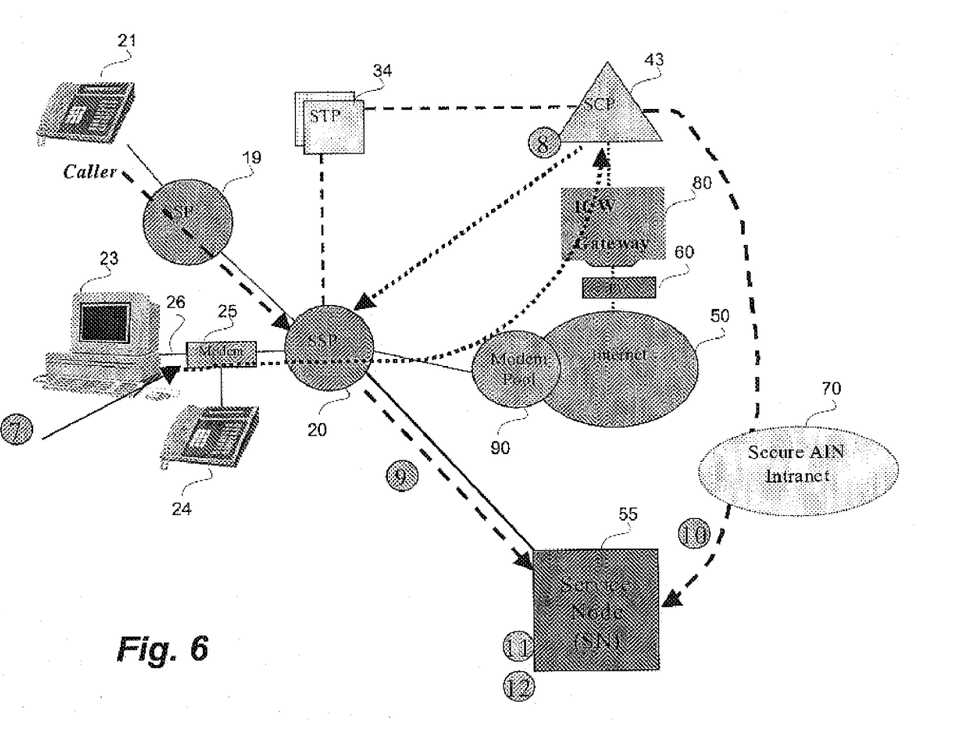
FIG. 6 illustrates a logical call flow of an Internet call waiting text message process according to the present invention.
Figure 7:
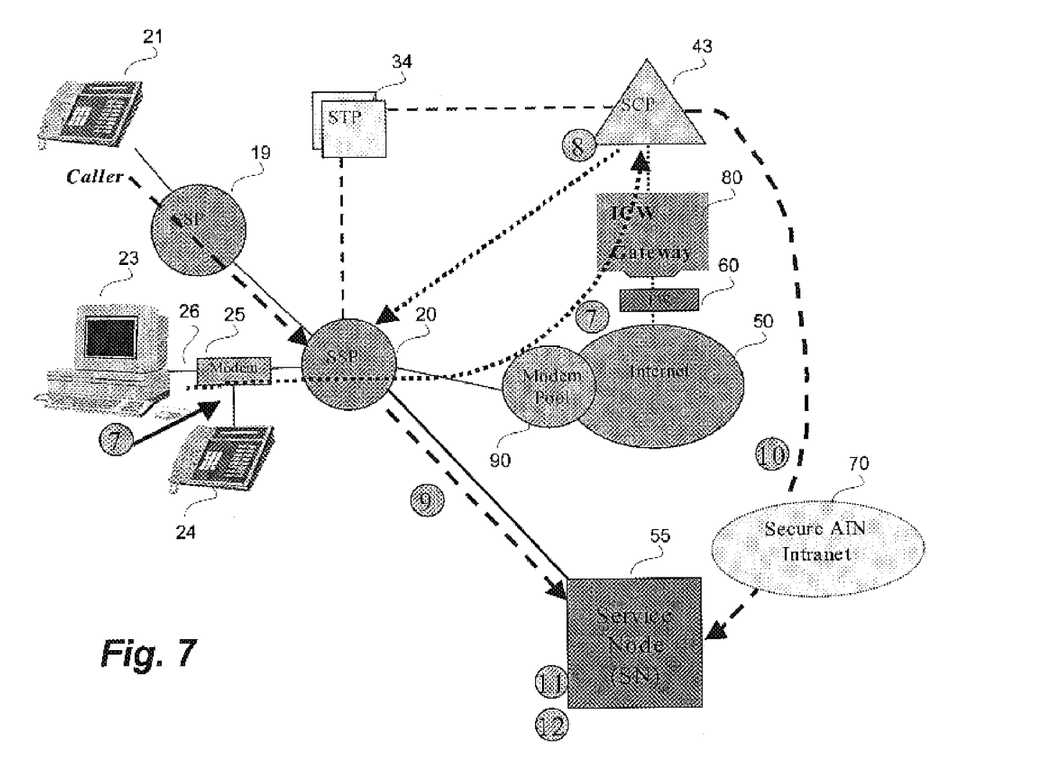
FIG. 7 illustrates a logical call flow of an Internet call waiting voice message process according to the present invention.
Figure 8:
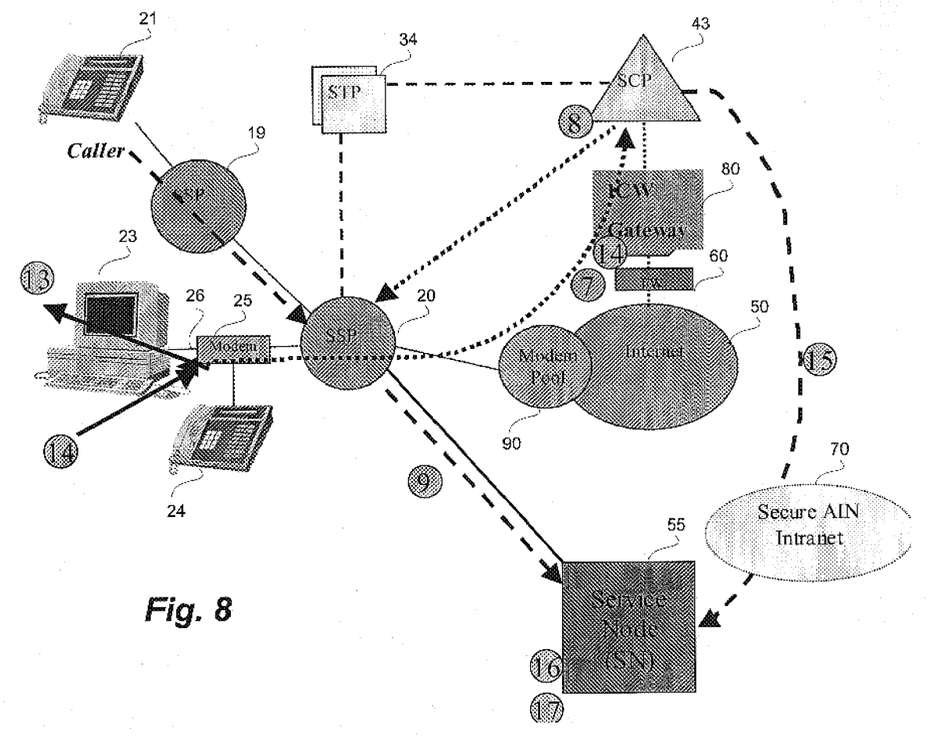
FIG. 8 illustrates a logical call flow of an Internet call waiting voice or text message process followed by connection to a calling party according to the present invention.

The modern Advanced Intelligent Network also includes service nodes (SN) such as service node 55 shown in FIGS. 6–8. Those skilled in the art are familiar with service nodes, which are physically implemented by the same types of computers that embody the SCP 42. In addition to the computing capability and data base maintenance features, service nodes 55 use ISDN lines and may include DTMF signal recognition devices, tone generation devices, text to speech (TTS) voice synthesis devices and other voice or data resources.

The Internet 50 is well known to those skilled in the art as essentially a package-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art. The Firewall 60 is preferably a combination of hardware and software that prevents or limits exposure of computers or network computers to unauthorized access or attack from outside the protected computer or network of computers. Accordingly to the present invention, the Firewall 60 prevents or limits access to a secure telecommunications network wherein the functionality of the present invention resides. That is, the Firewall 60 prevents or limits unauthorized access to the data, files, messages, and the like of subscribers to the services of the telecommunications provider. The secure AIN Intranet 70 preferably is a distributed telecommunications and computing network for providing services in accordance with the present invention. The Internet Call Waiting Gateway 80 provides access to the secure AIN Intranet 70 by the other components of the telecommunications network illustrated in FIG. 1. As is well known to those skilled in the art, a gateway may provide a number of functions including connectivity between incompatible communications networks.

Personalized Messages User Interfaces

Figure 2:
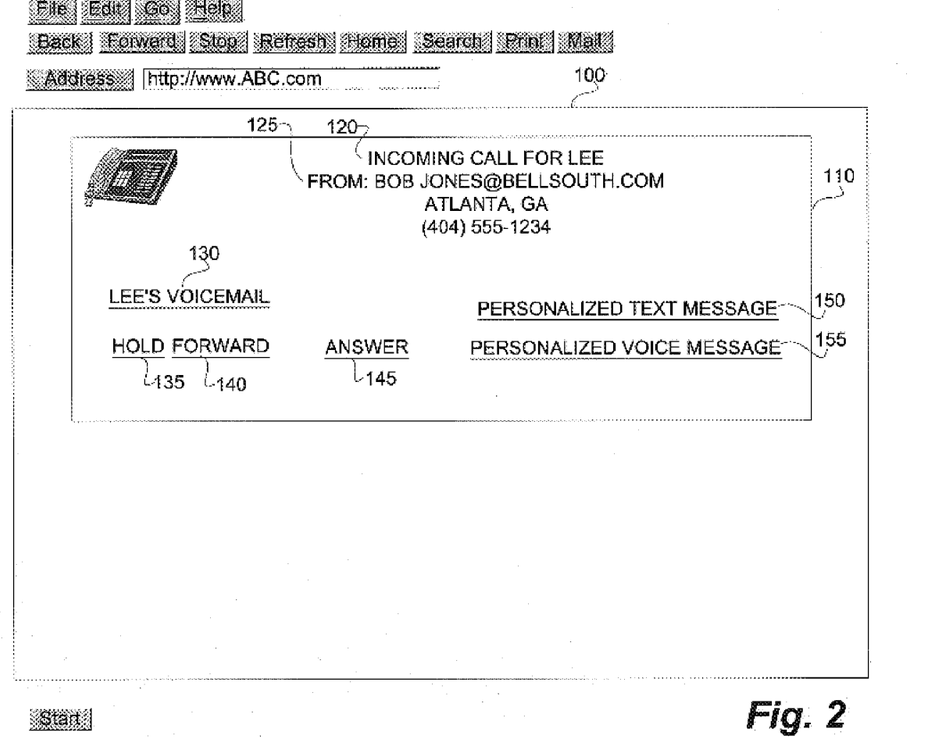
FIG. 2 illustrates a computer screen display showing a user interface for Internet call waiting according to the present invention.

Referring now to FIG. 2, the computer screen display 100 is illustrative of an Internet Web Page being viewed during an Internet session of a user of the present invention. According to the present invention, if the called party receives a telephone call during an Internet session, the personalized messaging drop box 110 is displayed over the display 100 that temporarily interrupts the called party's viewing of the contents of the display 100. The drop box 110 includes identification information for the called party 120 as well as identification information for the calling party 125. According to an exemplary embodiment of the present invention, the identifying information including the name, telephone number and address may be provided by a database look-up into a calling name database such as the CNAM database 48.

Upon receiving an incoming call from the calling party 125, the called party 120 may exercise a number of options provided in accordance with the present invention. Selection of the Voice Mail button 130 allows the called party to forward the incoming telephone call to her voice mail without interruption of the Internet session. Selection of the Hold button 135 allows the called party 120 to place the calling party 125 on hold until the called party terminates her Internet session. Selection of the Forward button 140 allows the called party to forward the incoming call to a designated forwarding number. Selection of the Answer button 145 allows the called party to terminate the present Internet session and Answer the incoming telephone call.

Figure 3:
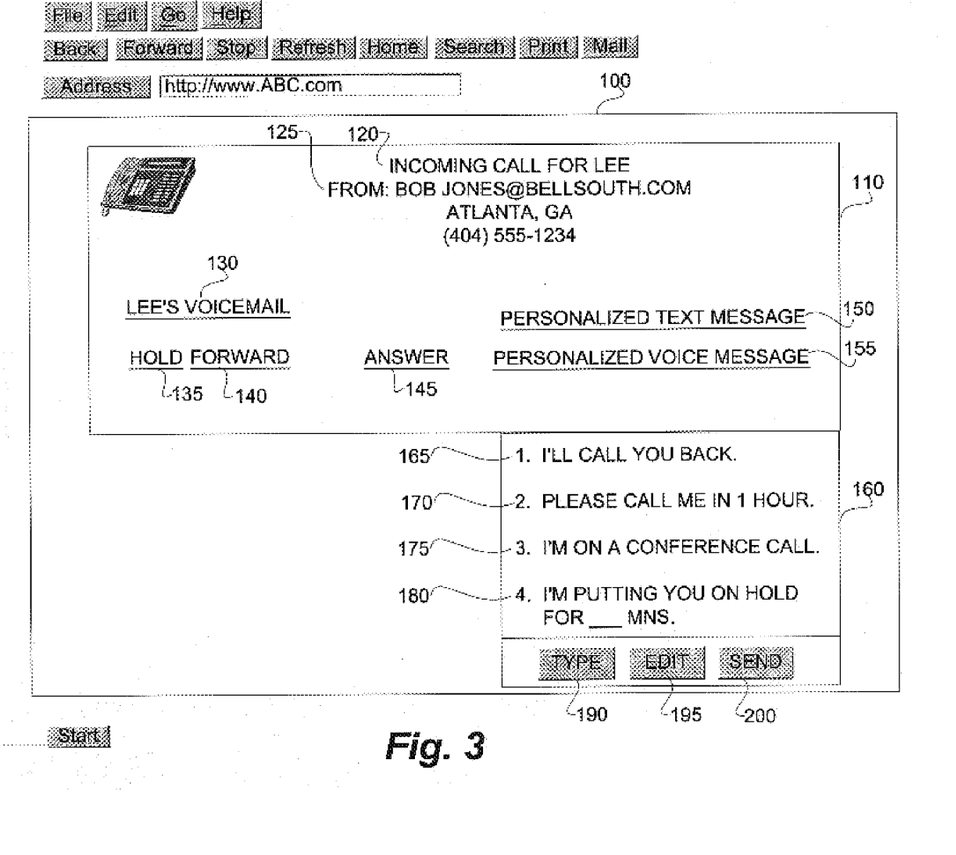
FIG. 3 illustrates a computer screen display showing a user interface for Internet call waiting with personalized text messages according to the present invention.

In accordance with the present invention, the user may type or select a previously stored personalized text message by selecting the personalized text message button 150. Selection of the text message button 150 causes the text message drop down box 160 to be displayed as shown in FIG. 3. As illustrated in the text message drop down box 160, a number of previously stored personalized text messages are displayed. For example, text message 165 includes the message "I'll call you back." Text message 180 reads "I'm putting you on hold for X minutes," where X is the number of minutes selected by the called party. According to the present invention, the called party may select any one of the previously stored personalized messages by highlighting the message and selecting the send button 200. Alternatively, the called party may select the edit button 195 to edit one of the previously stored personalized messages. If the called party wishes to type a new personalized message, the called party may select the type button 190, and the called party may type a new personalized message.

Figure 4:
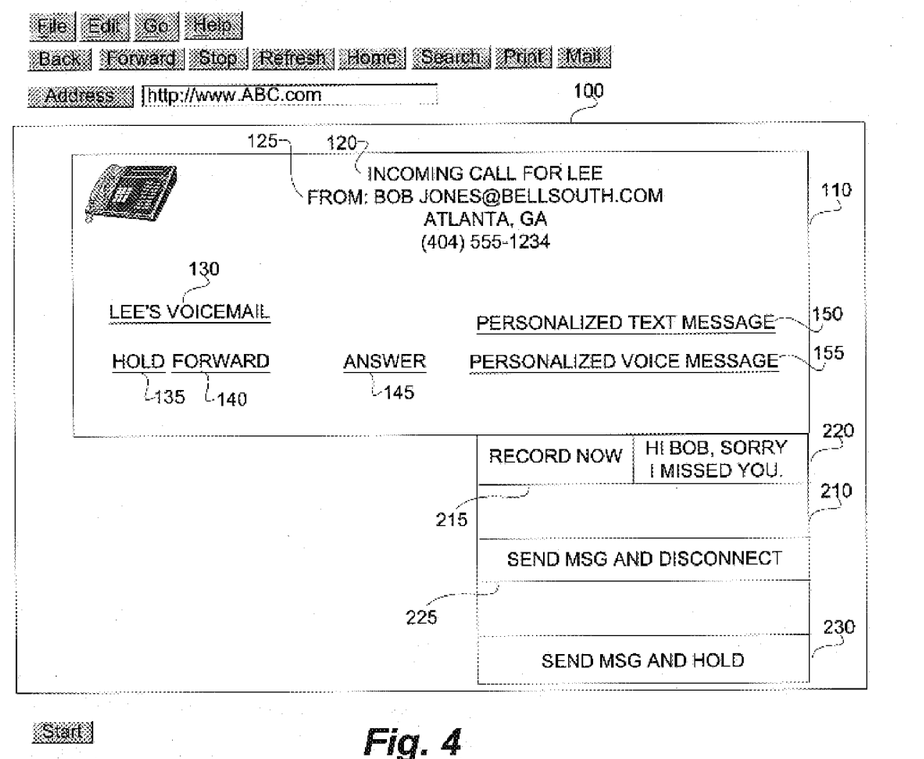
FIG. 4 illustrates a computer screen display showing a user interface for Internet call waiting with personalized voice messages according to the present invention.

Referring back to FIG. 2, selection of the personalized voice message button 155 opens the voice message drop box 210 illustrated in FIG. 4. The voice message drop box 210 includes a Record Now button 215, a Send Message and Disconnect button 225, and a Send Message and Hold button 230. If the called party receives an incoming telephone call and wishes to record a voice message to be sent to the calling party while the user concludes her Internet session, the user may select the Record Now button, and the user then speaks the desired message into the microphone on the user's computer or telephone set. For example, the user may select the Record Now button and speak the message "Hi Bob. Sorry I missed you." After the user has recorded the desired personalized voice message, the user may select the Send Message and Disconnect button 225, and the recorded message will be forwarded to the calling party as a response to the telephone call, and the call will be disconnected. Alternatively, the user may select the Send Message and Hold button 230, and the personalized voice message will be sent to the calling party, and the calling party will be placed on hold until the called party terminates the present Internet session.

Operation of an Exemplary Embodiment

Having described an exemplary operating environment and exemplary user interfaces with reference to FIGS. 1–4, the following is a description of the logical call flow of a system and method of the present invention for providing personalized text and voice messages to a calling party while a called party is engaged in an Internet session. At call state 1, a calling party 125 places a telephone call at his telephone set 21 through his local switch 19 directed to a called party who is engaged in an Internet session at the computer 23. The call attempt is received at the called party's switch 20, and a termination attempt trigger at call state 2A is fired causing a query at call state 2B to be forwarded to the SCP 43. According to the present invention, the trigger provisioned on the called party switch 20 causes the query to the SCP 43 for instructions from the SCP 43 for processing the call directed to the called party 120.

Figure 5:
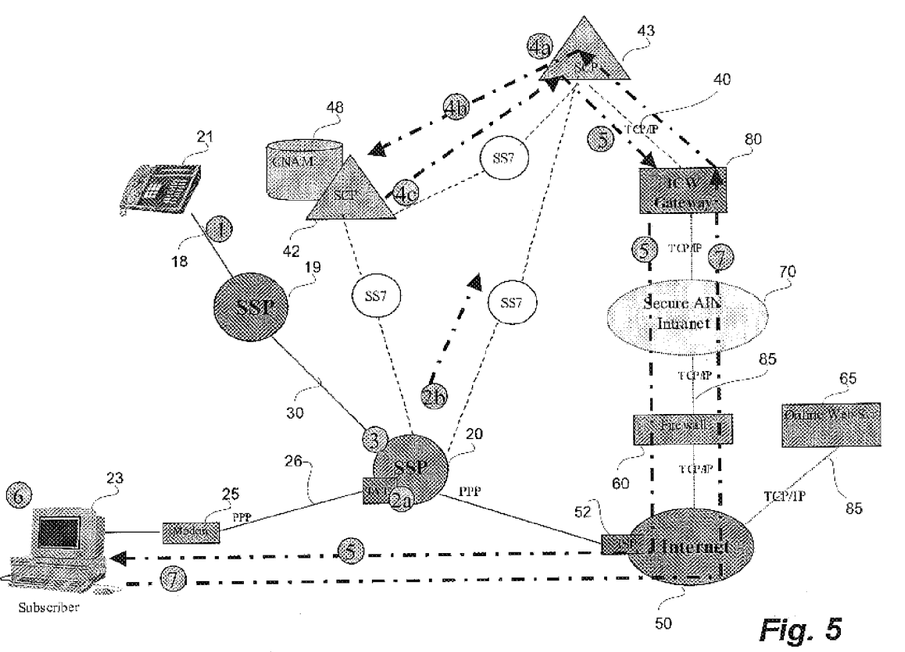
FIG. 5 illustrates a logical call flow of an Internet call waiting process according to the present invention.

At the SCP 43, a determination is made that the called party 120 is a subscriber to the functionality of the present invention for personalized voice and text Internet call waiting messaging. At call state 3, the called party's switch 20 provides an audio ring announcement to the calling party 125 at the calling party's telephone 21. At call state 4a, the SCP 43 determines that the called party is engaged in an Internet session utilizing the telephone line 26 between the called party's computer 23 and the called party's switch 20. The SCP 43 also determines that the called party is a valid subscriber to the functionality of the present invention.

In response to these determinations, the SCP 43 sends an Internet call waiting, message to the called party at the called party's computer 23 via the Internet Call Waiting Gateway 80 and through the Internet 50 to the Internet protocol address of the called party's computer 23 as located and determined by the SCP 43. At call state 4b, prior to sending the message to the called party, the SCP 43 queries the CNAM database 48, via the SCP 42, for caller identification information on the calling party 125. At call state 4c the caller identification information is forwarded to the SCP 43 for inclusion in the Internet call waiting message.

At call state 5, the gateway 80 sends the Internet call waiting message which includes the caller identification information to the called party's computer 23 via the Internet 50. At call state 6, the personalized messaging dialog box 110 is displayed on top of the current Internet web page display 100 as illustrated in FIG. 2. As described above, the called party's present Internet session is temporarily interrupted by the display of the dialog box 110. The dialog box 110 includes the name of the called party 120 and the caller identification information for the calling party 125. It should be understood that if caller identification information is not available for the calling party, an identification message may be displayed such as "Unknown Caller" or "Out of Area."

At call state 7, the called party selects one of the response buttons 130–155 to send an Internet call waiting message (reply) back to the SCP 43 for processing in accordance with the present invention. For example, if the called party selects the voice mail button 130, the selection will be forwarded through the Internet 50 and the gateway 80 back to the SCP 43. The SCP 43 will instruct the called party's switch 20 to open a trunk line between the calling party and the voice mail system of the called party. Likewise, if the called party selects the Answer button 145, the SCP 43 will instruct the called party switch 20 to terminate the Internet session and open a voice trunk between the calling party and the called party.

Referring now to FIG. 6, if the called party decides to forward a personalized text message to the calling party, the called party selects the personalized text message button 150 to display the text message drop box 160 illustrated in FIG. 3. As described above, the called party may select among the previously stored personalized text messages, or the called party may type a new text message or edit an old text message. For example, if the called party selects text message 165 reading "I'll call you back," the text message is forwarded to the SCP 43 via the Internet 50 and gateway 80. At call state 8, the SCP 43 instructs the called party's switch 20 to forward the calling party to the service node 55 to receive the text message from the called party. At call state 9, the switch 20 forwards the calling party to the service node 55 for presentation of the text message to the calling party.

At call state 10, the SCP 43 forwards the personalized text message to the service node 55. As described above, the service node 55 converts the personalized text message selected by the called party from text to speech for presentation in audio form to the calling party. If the conversion of the text message to audio format will take an excessive amount of time, the service node 55 may play a message to the calling party such as "Please wait. The called party is sending you a personalized message." At call state 11, the service node 55 plays an audio version of the personalized text message to the calling party. At call state 12, the service node 55 disconnects the call from the calling party.

If the calling party hangs up while the service node 55 is converting the text message to speech, the service node 55 places a return call to the calling party at the calling party's telephone 21. If the calling party answers the call, the text-to-speech formatted version of the personalized text message is played to the calling party. If the calling party's voice mail system answers the call, the service node 55 will send the text to speech message to the calling party's voice mail system. On the other hand, if the calling party's line is busy, the service node 55 will attempt to call the calling party with the personalized message for a set number of times prescribed by the called party as a subscriber to the services of the present invention. If the prescribed number of call attempts is exceeded, the SCP 43 may send a message to the called party at the called party's computer 23 that the personalized text message was not delivered to the calling party.

Referring now to FIG. 7, if the called party chooses to send a personalized voice message to the calling party in response to the incoming telephone call, the called party selects the personalized voice message button 155 in order to display the voice message drop box 210 illustrated in FIG. 4. The called party next selects the Record Now button 215 followed by the desired personalized voice message. For example, the called party may speak into the microphone of her computer 23 the message "Hi Bob, sorry I missed you." After the voice message is recorded, the called party may select the Send Message and Disconnect button 225. At call state 7, the voice mail message recorded by the called party is digitized in a digital audio file such as a WAV file or an MP3 file at the called party's computer 23. The digitized voice message is forwarded to the SCP 43 via the Internet 50 and gateway 80 for presentation to the calling party.

At call state 8, the SCP 43 instructs the called party's switch 20 to forward the calling party to the service node 55. At call state 9, the switch 20 connects the calling party to the service node 55. At call state 10, the SCP 43 sends the called party's voice message to the service node 55 for presentation to the calling party. At call state 11, the service node 55 plays the digital audio file prepared at the called party's computer 23 to the calling party. At call state 12, the service node 55 disconnects the telephone call with the calling party. As should be understood, if the called party had selected the Send Message and Hold button 230, the service node 55 would have placed the calling party on hold and awaited the called party's instruction to take the call from the calling party. As described above with respect to delivery of personalized text messages, the service node 55 may attempt to call the calling party to deliver the personalized voice message if the calling party hangs up before receiving the personalized voice message from the service node 55.

As shown in FIG. 8, the call states are illustrated for connection of the calling party to the called party after delivery of a voice or text message to the calling party in accordance with the present invention. If the called party forwarded a personalized text message or personalized voice message to the calling party with a request that the calling party be on hold for a set amount of time, the called party may terminate her Internet session and answer the call from the calling party by selecting the Answer button 145 illustrated in FIGS. 2–4. At call state 13, the dialog box 110 is refreshed with the Answer button 145 as an option available to the called party following call state 12 in which the calling party was placed on hold after being presented with the personalized message from the called party. At call state 14, the called party selects the Answer button 145, and the called party's Internet session is terminated. It should be understood that termination of the Internet session in this context includes making the telephone line between the computer 23 and the switch 20 available for use by the called party for receiving a voice telephone call from the calling party.

Selection of the Answer button 145 signals the SCP 43 via the Internet 50 and gateway 80 to connect the calling party with the called party. At call state 15, the SCP 43 sends the answer instruction to the service node 55. At call state 16, the service node 55 may play a previously recorded message to the calling party such as "One moment please while we connect your call." At call state 17, the service node 55 places a call to the called party via the called party's telephone 24, and the service node then connects the call between the calling party and the called party for completion of the call.

As described, a method and system are provided for allowing a called party to forward personalized text and voice messages to a calling party while the called party is engaged in an Internet session without interrupting the Internet session. The personalized text and voice messages are forwarded to the calling party in real time for receipt by the calling party and response thereto while the call remains in progress. Advantageously, the calling party may hold while the called party completes her Internet session followed by connection to the called party. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. In a telecommunications system, a method of sending a message to a calling party from a called party where the calling party places a telephone call to the called party while the called party is operating a computing device utilizing the same telephone line as is used for receipt of telephone calls from the calling party, comprising the steps of:

receiving a telephone call from the calling party to the called party;

determining the called party's line is in use by the called party's computing device;

obtaining caller identification information for the calling party;

routing the caller identification information to the called party's computing device;

notifying the called party of an incoming telephone call from the calling party;

sending a message from the called party to the calling party without interrupting the called party's line that is in use by the called party's computing device; and if the calling party disconnects the calling party's line prior to the step of sending the message to the calling party, then calling the calling party to provide the message to the calling party.

2. The method of claim 1, further comprising the step of: connecting the calling party to the called party after the called party's telephone line is available for use.

3. The method of claim 1, further comprising the step of: while notifying the called party of an incoming telephone call from the calling party, keeping the call from the calling party in progress.

4. The method of claim 3, further comprising the step of: routing the caller identification information to the called party's computing device via a distributed computing system.

5. The method of claim 4, wherein the distributed computing system is the Internet.

6. The method of claim 1, after the step of routing the caller identification information to the called party's computing device, further comprising the step of:

displaying caller identification information on the called party's computing device.

7. The method of claim 6, whereby the step of displaying the caller identification information includes displaying the caller identification information via a graphical user interface overlaying a screen display presently displayed on the called party's computing device.

8. The method of claim 1, further comprising the step of: providing the called party with options for responding to the call from the calling party.

9. The method of claim 8, whereby the options include routing the calling party to a called party voice mail system.

10. The method of claim 9, whereby the options further include placing the calling party on hold.

11. The method of claim 10, whereby the options further include forwarding the call from the calling party to a different telephone directory number.

12. The method of claim 11, whereby the options further include disconnecting the called party's computing device from the called party's line, and answering the call from the calling party.

13. The method of claim 1, prior to the step of sending a message to the calling party, selecting a previously saved message.

14. The method of claim 13, whereby the step of sending a message to the calling party includes sending a message to the calling party while the call from the calling party is still in progress.

15. The method of claim 14, whereby sending a message to the calling party, further comprises:

sending a text message to the calling party.

16. The method of claim 15, further comprising the step of:

converting the text message from text to speech format.

17. The method of claim 15, prior to the step of sending the message to the calling party, editing a previously saved text message.

18. The method of claim 15, prior to the step of sending a text message to the calling party, typing a text message for sending to the calling party in response to the call from the calling party.

19. The method of claim 15, further comprising the step of:

disconnecting the calling party's line after sending the text message to the calling party.

20. The method of claim 15, further comprising the step of:

placing the calling party on hold after sending the text message to the calling party.

21. The method of claim 20, after the step of placing the calling party on hold, connecting the calling party to the called party after the called party disconnects the called party's computing device from the called party's line.

22. The method of claim 1, whereby the step of sending a message to the calling party further comprises the step of:

sending a voice message to the calling party.

23. The method of claim 22, after the step of sending the voice message to the calling party, placing the calling party on hold.

24. The method of claim 23, after the step of placing the calling party on hold, connecting the calling party to the called party after the called party disconnects the called party's computing device from the called party's line.

25. The method of claim 22, whereby sending a voice message to the calling party further comprising sending the voice message to the calling party while the call from the calling party is still in progress.

26. The method of claim 22, prior to the step of sending the voice message to the calling party, recording a personalized voice message in response to the call from the calling party.

27. The method of claim 22, after the step of sending the voice message to the calling party, disconnecting the calling party's line.

28. The method of claim 1, further comprising the step of: if the calling party does not answer, notifying the called party that the message was not delivered to the calling party.

29. In a telecommunications system, a method of sending a message to a calling party from a called party where the calling party places a telephone call to the called party while the called party is operating a computing device utilizing the same telephone line as is used for receipt of telephone calls from the calling party, comprising the steps of:

receiving a telephone call from the calling party to the called party;

determining the called party's line is in use by the called party's computing device;

obtaining caller identification information for the calling party;

routing the caller identification information to the called party's computing device;

notifying the called party of an incoming telephone call from the calling party;

while notifying the called party of an incoming telephone call from the calling party, keeping the call from the calling party in progress;

displaying caller identification information on the called party's computing device;

sending a message from the called party to the calling party without interrupting the called party's line that is in use by the called party's computing device; and if the calling party disconnects the calling party's line prior to the step of sending the message to the calling party, then calling the calling party to provide the message to the calling party.

30. The method of claim 29, whereby the step of sending a message to the calling party further comprises the step of:

sending a voice message to the calling party while the call from the calling party is still in progress.

31. The method of claim 30, after the step of sending the voice message to the calling party, disconnecting the calling party's line.

32. The method of claim 30, after the step of sending the voice message to the calling party, placing the calling party on hold; and connecting the calling party to the called party after the called party disconnects the called party's computing device from the called party's line.

33. The method of claim 29, whereby sending a message to the calling party, further comprises:

sending a text message to the calling party while the call from the calling party is still in progress; and converting the text message from text to speech format.

34. The method of claim 33, further comprising the step of:

disconnecting the calling party's line after sending the text message to the calling party.

35. The method of claim 33, further comprising the step of:

placing the calling party on hold after sending the text message to the calling party; and connecting the calling party to the called party after the called party disconnects the called party's computing device from the called party's line.

36. The method of claim 29 further comprising the step of:

connecting the calling party to the called party after the called party's telephone line is available for use.

37. The method of claim 29, further comprising the step of:

providing the called party with options for responding to the call from the calling party.

38. In a telecommunications system, a system for sending a message to a calling party from a called party where the calling party places a telephone call to the called party while the called party is operating a computing device utilizing the same telephone line as is used for receipt of telephone calls from the calling party, comprising:

a switch operative to receive a telephone call from the calling party to the called party;

a service control point operative to determine the called party's line is in use by the called party's computing device;

to obtain caller identification information for the calling party;

to route the caller identification information to the called party's computing device via a distributed computing system;

to notify the called party of an incoming telephone call from the calling party;

to keep the call from the calling party in progress while notifying the called party of an incoming telephone call from the calling party;

the computing device operative to display caller identification information on the called party's computing device, and to send a message from the called party to the calling party without interrupting the called party's line that is in use by the called party's computing device; and a service node operative to place a return call to the calling party to provide the message to the calling party in response to the calling party disconnecting the calling party's line prior to the service control sending the message to the calling party.

39. The system of claim 38, the service control point being further operative:

to send an audio message to the service node from the called party directed to the calling party for provision to the calling party.

40. The system of claim 38, the service control point being further operative:

to connect the calling party to the called party after the called party's telephone line is available for use.

41. The system of claim 38, the service control point being further operative:

to send a text message to the service node from the called party directed to the calling party for provision to the calling party in speech format.

42. The system of claim 41, further comprising: the service node operative to receive a text message from the called party directed to the calling party while the call from the calling party is still in progress;

to convert the text message from text to speech format; and to provide the text message to the calling party.

43. The system of claim 42, the service node being further operative:

to disconnect the calling party's line after providing the text message to the calling party.

44. The system of claim 43, the service node being further operative:

to place the calling party on hold after providing the text message to the calling party; and to connect the calling party to the called party after the called party disconnects the called party's computing device from the called party's line.

45. The system of claim 38, the service node being further operative to send a voice message to the calling party while the call from the calling party is still in progress.

46. The system of claim 45, the service node being further operative to place the calling party on hold after providing the voice message to the calling party; and to connect the calling party to the called party after the called party disconnects the called party's computing device from the called party's line.

47. The system of claim 45, the service node being further operative to disconnect the calling party's line after providing the voice message to the calling party.

* * * * *

UNITED STATES PATENT AND TRADEMARK OFFICE
CERTIFICATE OF CORRECTION

PATENT NO. : 6,724,872 B1
DATED : April 20, 2004
INVENTOR(S) : Moore et al.

It is certified that error appears in the above-identified patent and that said Letters Patent is hereby corrected as shown below:

<u>Title page,</u>
Item [57], ABSTRACT,
Line 16, "party' terminates" should read -- party terminates --

<u>Column 12,</u>
Line 32, insert a line break after "comprising:" and before "the service"

Signed and Sealed this

Fourteenth Day of December, 2004

JON W. DUDAS
*Director of the United States Patent and Trademark Office*